Nov. 22, 1955     M. MALLORY     2,724,371
INTERNAL COMBUSTION ENGINE
Filed Nov. 26, 1952
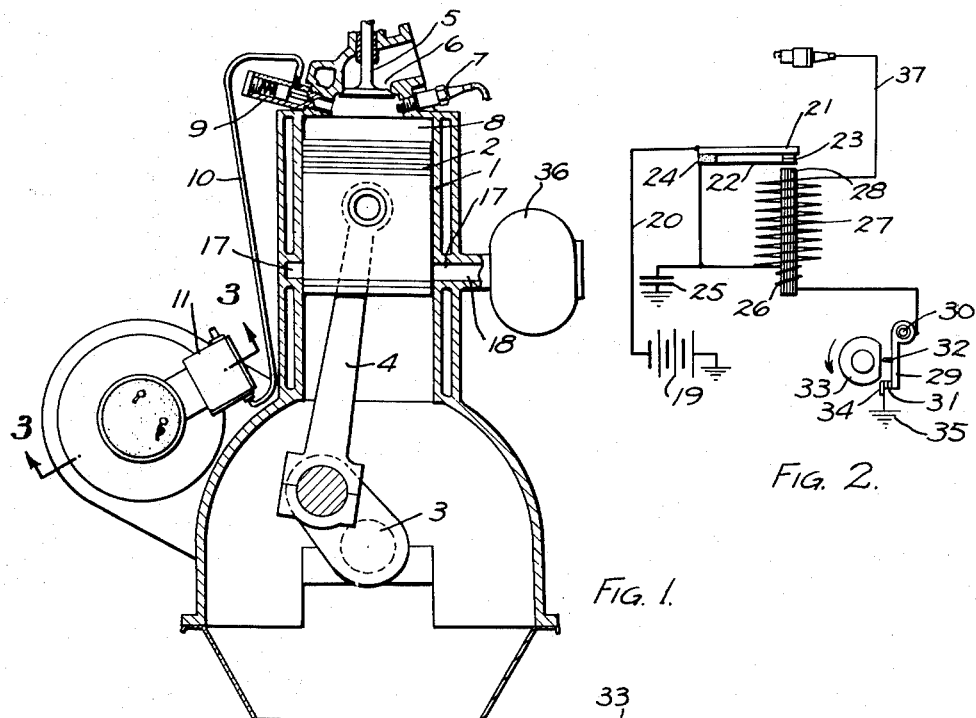
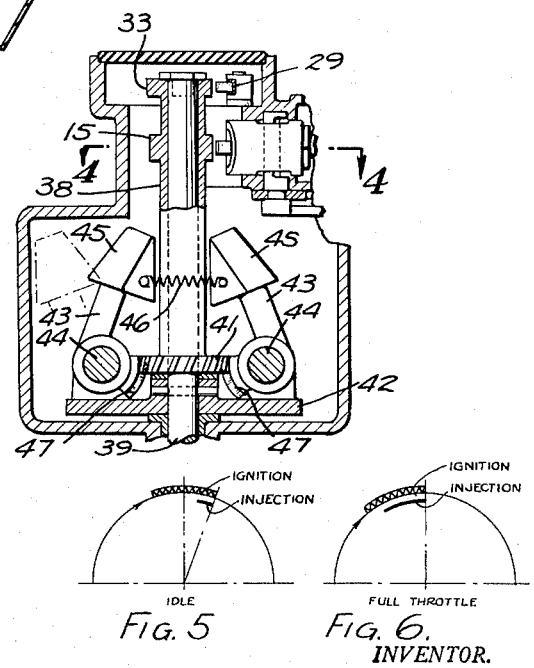
INVENTOR.
MARION MALLORY
BY
*Barnes, Kisselle, Laughlin & Raisch*
ATTORNEYS.

United States Patent Office 2,724,371
Patented Nov. 22, 1955

2,724,371

INTERNAL COMBUSTION ENGINE

Marion Mallory, Detroit, Mich.

Application November 26, 1952, Serial No. 322,753

11 Claims. (Cl. 123—32)

This invention relates to an internal combustion engine and more particularly to an internal combustion engine wherein the combustion is caused by an electric spark of long duration and the timing of combustion is effected by the injection of liquid fuel into the combustion chamber.

This invention constitutes an improvement on the internal combustion engine of my application Serial No. 290,998, filed May 31, 1952.

In my copending application the spark of long duration is produced by a vibrating coil or transformer and the spark is timed so that sparking always begins in each combustion chamber before injection and the sparking continues throughout part or all of the injection and, in any event, until combustion of the fuel mixture begins. In such an arrangement where high frequency sparks are produced by an armature or vibrator there will always be a lag in the occurrence of the sparks after the primary circuit is closed. This is especially true with a vibrating coil because the magnetic power of the core of the transformer or spark coil must raise to a certain strength before the armature is attracted to interrupt the primary circuit which is necessary to cause a spark. This time lag or factor which is involved in magnetizing the coil sufficiently to attract the circuit breaker armature and interrupt the primary circuit might very well in some instances cause the injection to begin before the high frequency spark, for example, if the spark were set to begin at 15° before the crankshaft reached dead center position and at idle speed the injection began at 5° before dead center, this would be satisfactory because the spark would begin 10° before injection. However, if this engine is speeded up by advancing the time (and also increasing the dwell) of injection in accordance with conventional Diesel practice to say, for example 15° before dead center, then the spark, due to the time lag mentioned above, would not occur at exactly 15° before dead center but would be delayed somewhat and there would be no spark across the spark plug electrodes at the time the injection began. This would produce condensed fuel in the combustion chamber which would not burn properly.

It is an object of this invention to obviate the above disadvantage and this object is accomplished by arranging the timing of both the spark and the injection so that the spark will always precede the injection and as the injection timing is advanced, the spark timing will be correspondingly advanced to maintain a desirable lead in the spark advance over that of the injection advance. For example, if the injection is set to occur at dead center when the engine is idling, the spark will be set to begin at 10° before dead center and the timing arrangement for the spark and the injection will be set so that no matter how much the injection is advanced the spark will be correspondingly advanced to maintain the lead over the injection.

This object can be accomplished by mounting both the spark timing cam and the injection cam in fixed relation on a common shaft which is advanced by a governor as the engine speed increases and retarded as the engine speed decreases.

In the drawings:

Fig. 1 is a somewhat diagrammatic section through my engine showing the governor controlled ignition and injection timing arrangement.

Fig. 2 is a diagrammatic showing of the ignition system for my engine.

Fig. 3 is a section along the line 3—3 of Fig. 1 showing the engine driven governor controlled injection and spark advance mechanism.

Fig. 4 is a section along the line 4—4 of Fig. 3 showing the cam for controlling a conventional liquid fuel injection pump.

Fig. 5 is a diagrammatic showing of the ignition spark and injection timing and dwell when the engine is idling and Fig. 6 is a diagrammatic showing of the ignition spark and injection timing and dwell when the engine is operating at full throttle and high speed. In both Figs. 5 and 6 the vertical line indicates crankshaft dead center.

My engine, which for descriptive purposes and not by way of limitation, is here shown as a two-cycle engine comprising the following parts: cylinder 1, piston 2, crankshaft 3, connecting rod 4 between the crankshaft 3 and piston 2, exhaust valve 5 controlling exhaust port 6, spark plug 7, combustion chamber 8, injection nozzle 9 connected by line 10 with a conventional injection pump 11 for injecting liquid fuel under high pressure, intake 12 to pump 11, line 13 supplying intake port 12 of pump 11 with fuel from a source of liquid fuel (not shown), pump plunger 14, cam 15 for actuating plunger 14 on its compression stroke, spring 16 for actuating plunger 14 on its intake stroke.

Cylinder 1 is provided with air intake ports 17 preferably equally spaced about cylinder 1 and connected through passageway 18 with an air blower or compressor 36 for supplying air to the intake ports under pressure.

The ignition means comprises an electric battery 19 connected through wire or line 20 with a contact 21, vibrating reed or armature 22 provided with a contact 23 and pivoted as at 24, condenser 25, primary winding 26, secondary winding 27, iron core 28. A circuit breaker is connected into the primary circuit and comprises an arm 29 pivoted at 30, contact 31 on arm 29, rubbing block 32 on arm 29 which engages the ignition cam 33, fixed contact 34, ground 35. The secondary coil is connected by electric transmission line 37 with one of the electrodes of spark plug 7, the other electrode being grounded to the engine block.

An injection pump 11 will be provided for each cylinder. Both the injection pump cam 15 and the ignition timing cam 33 are fixed to a hollow shaft 38 which is journalled on a rotary shaft 39 which is run off of the main engine shaft 3 by means of a gear train. A spiral gear 41 is fixed on the lower end of hollow shaft 38 so that, in effect, spiral gear 41, shaft 38 and cams 15 and 33 are integral or fixed together. Main shaft 39 is provided with an enlarged flange 42 which serves as a platform or support upon which governor arms 43 are pivoted as at 44. The governor weights are designated 45. A tension spring 46 is connected at its opposite ends to the governor weights 45. The governor arms 43 are in the form of bell crank levers and have the lower arm portions 47 provided with spiral gear teeth which mesh with the spiral gear teeth of spiral gear 41.

Since shaft 39 and plate 42 are rotated off the main engine crankshaft, the speed of rotation of shaft 39 correspondingly increases and decreases with the speed of the engine. As the speed of the engine increases, the governor weights 45, due to centrifugal force, move outwardly or away from each other and thereby co-act with the spiral gear 41 to rotate shaft 38 on shaft 39 and thereby advance simultaneously both the cam 15 and the cam 32 a like number of degrees and in accordance with engine speed. Similarly upon a decrease in engine speed the governor 33 acts through spiral gear 44 to retard simultaneously a like number of degrees cams 15 and 33. Hence, if the ignition cam 33 is set to close circuit breaker 31, 34 at, for example 40° before the engine crankshaft 3 reaches dead center, then injection cam 15 will be set to start on its injection stroke, say, for example, 30° before dead center (Fig. 6). This 10° differential in setting between cams 15 and 33 on hollow shaft 38 is merely given by way of example but is a permanent or fixed setting so that spark timing will always be in advance of injection timing.

The injection pump 11, of course, will be provided with a conventional arrangement for varying the stroke of plunger 14 to vary the amount of fuel injected into the cylinder on each stroke so that the amount of fuel injected on each stroke of the pump will be in accordance with the torque demands on the engine. However, variation in the stroke of plunger 14 will in no wise affect the arrangement of the cams 15 and 33 so that sparking at the spark plug electrodes will always precede the beginning of the injection through nozzle 9 and this sparking will always continue through part or all of the injection. However, if the stroke of the plunger 14 is decreased due to lessened torque demands on the engine, then the number of degrees that the spark will lead the injection will increase, but under all operating conditions the spark will always lead the injection by at least the number of degrees that the spark cam 33 leads injection cam 15.

In the operation of the engine, as the piston 2 reaches the bottom of its stroke below intake ports 17, the exhaust valve 5 will be opened by a timed cam (not shown) and air will be forced into the cylinder through ports 17 by a charger thereby scavenging the cylinder of the exhaust gases through port 6 and replacing the exhaust gases with a charge of fresh air, exhaust valve 5 closes and the piston begins the compression stroke thereby compressing the air in the cylinder. The timing of the ignition or sparking and the injection of the fuel will proceed on each cycle of operation as above outlined.

A single vibrating coil and a single circuit breaker for each coil is preferably used for each engine cylinder. This greatly reduces the load on the vibrating contact points and eliminates or obviates the need for the high tension distributor cap and rotor conventionally used in internal combustion engine ignition systems.

Although I have shown a vibrating spark coil for producing the spark of long duration at spark plug 7, it is understood that any suitable arrangement can be used for producing a spark of long duration at the electrodes of spark plug 7 and whether the spark of long duration is a continuous spark or a high frequency spark is immaterial just so long as the spark occurs prior to the beginning of injection and endures throughout all or a part of the injection or at least until the combustion of the fuel mixture begins.

The drawing shows a single cylinder engine, but if a multiple cylinder engine is used, there will be one coil, one cam 33 and one circuit breaker for each cylinder. I realize such an ignition system is not new in multicylinder engines and has proven to be impractical because in systems of this construction, it was practically impossible to get the spark timed so it would occur at even intervals from one cylinder to the other. It was always necessary to continuously adjust the contacts so they would break at even intervals but in my system the spark does not do the timing, the injection does, and even though the adjustments between the individual coils or circuit breakers should vary due to wearing down of the contact points, it will not affect the ignition timing because the injection does the timing. For example, the adjustment of the breakers 29 might be different so as to cause the spark to occur 5° earlier in one cylinder than in another, but as long as a spark started before injection, the timing of the engine would not be affected. Due to the fact that the engine is timed by injection, it makes this type of ignition practical and at the same time eliminates the use of a distributor cap and extra wiring.

I have also illustrated ignition cam 33 and injection cam 15 as mounted integrally on a hollow shaft 38 so that each will be advanced and retarded a like amount. I do not wish to be limited to using the ignition advance cam 33 on the same shaft as the injection pump cam 15. The shafts can be separated and a separate advance mechanism can be used to advance the spark as long as the spark advances with the injection advance. In some cases it will be desirable to advance the spark timing cam by a separate governor running at the same speed as the shaft that operates the injection cam 15 but so arrange the ignition cam 33 so that it will advance through a greater number of degrees than the injection cam 15. The main principle which characterizes my invention is to always have the spark begin before injection regardless of speed conditions and have the spark continue after injection begins.

Neither do I wish to be limited to the vibrator coil because it is possible in this type of system (due to the long contact dwell that can be had on a single cam) to build a coil that will have a long spark duration that would start before injection began and continue a considerable time after injection started.

The operation of the vibrating spark coil is conventional. Each time circuit breaker 29 closes the circuit through battery 19 and primary coil 26, the magnetic action of the primary coil moves armature 22 to separate breaker points 21, 23 and the circuit is interrupted until the magnetism created by the primary coil fades to a point where the armature moves away from the coil, again causing the breaker points 21, 23 to contact. Thus, a rapid succession of relatively high voltage sparks are induced by secondary coil 27 and cross the spark gap in spark plug 7 and produce a hot spot.

Although I have illustrated my invention with respect to a two cycle engine provided with an air blower or compressor 36, it is understood that my invention will work equally well on a four cycle engine where the piston draws in an air charge instead of having the air charge forced into the cylinder by a compressor 36.

Instead of using a storage battery as a source of current, I can use an alternating current generator. When using an alternating current generator, I can use either of the ignition systems or circuits shown in Figs. 9 and 10 of my copending application Serial No. 290,998, filed May 31, 1952.

With the above described system having one spark coil, one cam, and one circuit breaker for controlling the ignition for each cylinder, as much as 100° cam dwell of the circuit breaker can be had on a multiple cylinder engine. Such a long dwell is not possible if a single cam is used to operate four circuit breakers, as in a conventional ignition system, because there are only 360° in a circle. The long cam dwell in my above described system makes it possible to make a coil with a long spark dwell because a very high induction coil does give a long spark dwell. By "high induction coil" I refer to a coil with a great number of primary turns or a great amount of iron in the core. A high induction coil will not build up or magnetize to any degree on the short dwell of a primary circuit closure such, for example, if an eight point cam were used with eight circuit breakers on it, and therefore a low induction coil would have to be used with such an eight point cam. However, such a low induction coil when used with an eight point cam would not magnetize at all at high engine speed and even at slower speeds the spark would be of a too short a duration. Therefore, it is necessary to use one cam and one coil per cylinder to make possible the use of a very high induction coil which is necessary to get a long duration spark. The higher the induction of the coil, the slower the coil magnetizes and the slower it will demagnetize and slow demagnetization of the coil provides a slow discharge or long dwell of the spark.

I claim:

1. In an internal combustion engine comprising a combustion chamber, means for compressing a charge of air in said chamber, means for injecting fuel into said combustion chamber near the end of the compression stroke, a spark gap in said combustion chamber, means for establishing a spark across said gap, and means responsive to engine speed and co-acting with said spark means and fuel injecting means to initiate the spark before injection begins and to correspondingly advance both the spark and injection timing with the speed of the engine.

2. In an internal combustion engine comprising a combustion chamber, means for compressing a charge of air in said chamber, means for injecting fuel into said combustion chamber near the end of the compression stroke, a spark gap in said combustion chamber, means for discharging a spark across said spark gap starting before injection begins and continuing during the injection period at least until combustion of the fuel-air mixture begins, cam means for controlling said injection means, and cam means for controlling said sparking means, means for mounting said two cam means in fixed relation to each other with respect to engine crankshaft rotation whereby the spark cam means always leads the injection cam means, and speed responsive mechanism connected to both said cam means for advancing and retarding the same in response to engine speed.

3. In an internal combustion engine comprising a combustion chamber, means for compressing a charge of air in said chamber, means for injecting fuel into said combustion chamber near the end of the compression stroke, a spark gap in said combustion chamber, means for establishing a high voltage spark across said spark gap before injection begins and continuing during the injection period, a cam controlling the initiation and dwell of said spark, a cam controlling the initiation and dwell of said injection, and a governor responsive to engine speed for advancing and retarding each of said cams a like amount as the governor responds respectively to an increase and decrease in engine speed.

4. The combination defined in claim 3 wherein said cams are mounted in fixed relation to each other.

5. The combination defined in claim 3 including an engine driven shaft, a mounting journalled on said shaft, said cams being fixed on said mounting, a governor supported on said shaft to rotate therewith, and a driving connection between said governor and the cam mounting for advancing the cams as the speed of the shaft increases and for retarding the cams as the speed of the shaft decreases.

6. In an internal combustion engine comprising a cylinder and a reciprocating piston therein, a portion of said cylinder serving as a combustion chamber, an air intake port through which air is admitted into the cylinder preparatory to the compression stroke of said piston, an exhaust port, valve means controlling said ports, means for establishing a high voltage spark in the combustion chamber before and during injection of fuel, and means for injecting liquid fuel into the compressed air in the combustion chamber and into said spark, said injection means being timed to begin the injection after said spark is established for each power stroke of the engine, and means responsive to engine speed for simultaneously advancing the timing of said spark means and said injection means a number of degrees with respect to engine crankshaft rotation as the speed of the engine increases and for correspondingly retarding the timing of said spark and injection means as the speed of said engine decreases.

7. The combination defined in claim 6 wherein the engine responsive means includes a governor, an ignition cam and an injection cam fixed in relation to each other, and a driving connection between said governor and the cams for advancing the cams angularly in response to an increase in engine speed and retarding the same in response to a decrease in engine speed.

8. The combination defined in claim 7 including an engine driven shaft, the governor being mounted on said shaft to rotate therewith, a hollow shaft journalled over said engine driven shaft, said cams being fixed on said hollow shaft, and a driving connection between the governor and the hollow shaft for advancing the hollow shaft and cams angularly about the engine driven shaft in response to increasing engine speed whereby the injection and spark timing are advanced.

9. In a multi-cylinder internal combustion engine, a reciprocating piston in each cylinder, a portion of each cylinder serving as a combustion chamber, an air intake port for each cylinder through which air is admitted into the cylinder preparatory to the compression stroke of said piston, an exhaust port for each cylinder, valve means controlling said ports, independent means for each cylinder for establishing a high voltage spark in the combustion chamber before and during injection of fuel, and independent means for each cylinder for injecting liquid fuel into the compressed air in the combustion chamber and into said spark, said injection means for each cylinder being timed to begin the injection after said spark is established for each power stroke of the piston, the timing of the combustion of the fuel-air mixture in each cylinder being effected by the injection of the liquid fuel into each cylinder.

10. The combination defined in claim 9 wherein each fuel injecting means comprises a fuel nozzle through which the liquid fuel is injected into the combustion chamber, a fuel pump connected to said nozzle and an engine driven cam for controlling the discharge of the fuel from said pump, the said cams for said fuel pumps being positioned to effect fuel discharge from said pump consecutively at intervals of crankshaft rotation.

11. In a multi-cylinder internal combustion engine, a reciprocating piston in each cylinder, a portion of each cylinder serving as a combustion chamber, an air intake port for each cylinder through which air is admitted into the cylinder preparatory to the compression stroke of the piston, an exhaust port for each cylinder, valve means controlling said ports, individual means for each cylinder for injecting liquid fuel into the compressed air in the combustion chamber and independent means for each cylinder for establishing a high voltage spark in the combustion chamber timed to occur before and during injection of fuel, said last mentioned means comprising a slowly magnetized, very high induction coil, a single circuit breaker associated with a condenser for each cylinder in circuit with said coil, a single lobe cam for each cylinder for operating said circuit breaker, means for rotating said cam at a speed proportional to the speed of the engine, the lobe of said cam being designed to produce a relatively long dwell to provide sufficient time to magnetize said slow magnetizing coil, the collapse of the magnetic lines in said coil being relatively slow so that the spark discharge from said coil will occur over a relatively great number of degrees of piston travel.

References Cited in the file of this patent

UNITED STATES PATENTS

| | | |
|---|---|---|
| 1,903,381 | Kennedy | Apr. 4, 1933 |
| 2,093,339 | Pippig | Sept. 14, 1937 |
| 2,145,250 | Dillstrom | Jan. 31, 1939 |
| 2,431,857 | Fenney | Dec. 2, 1947 |
| 2,484,009 | Barber | Oct. 11, 1949 |